No. 12,552. REISSUED NOV. 6, 1906.
S. OTIS.
END SILL FOR CARS.
APPLICATION FILED JULY 30, 1906.
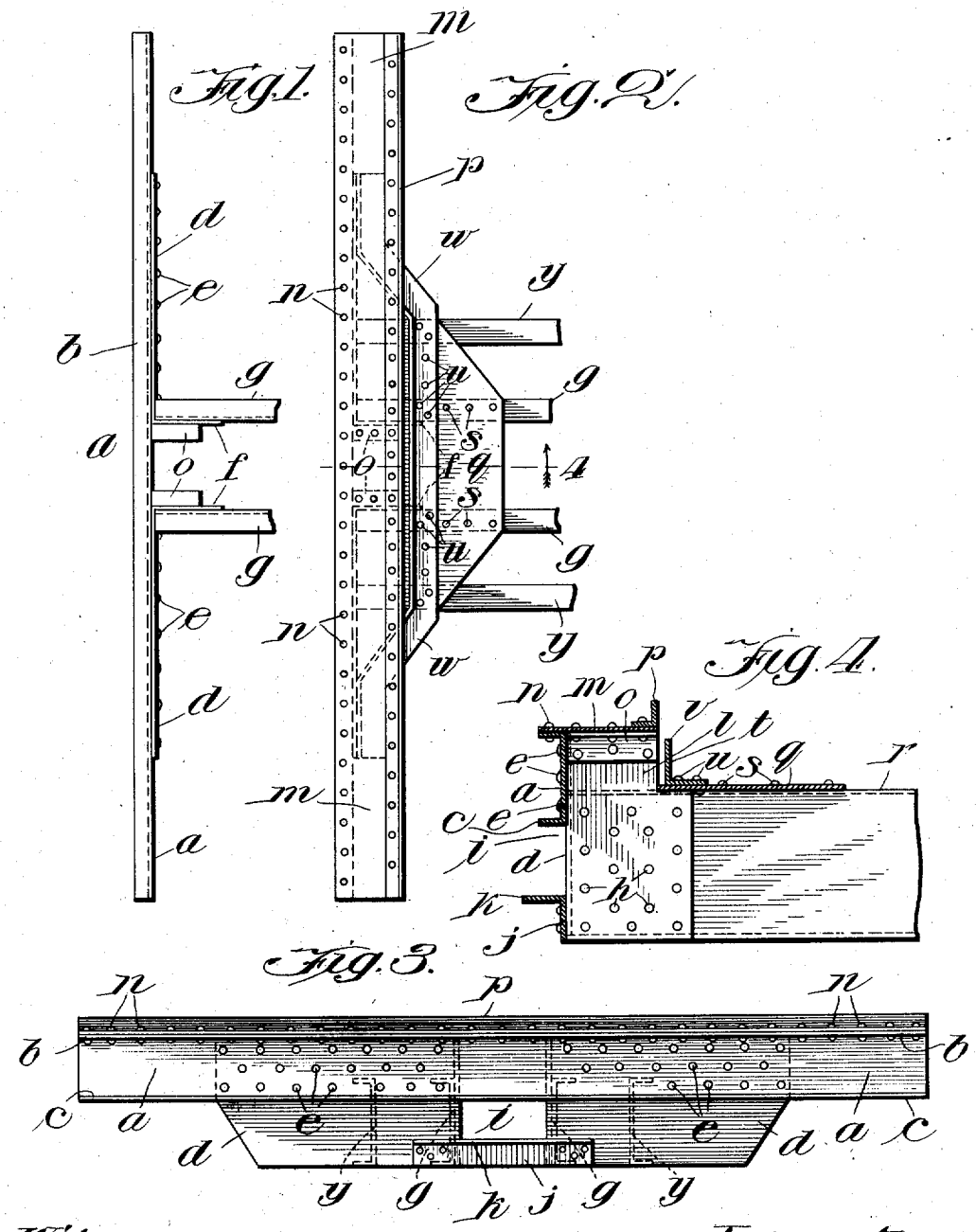
Witnesses:
Harry S. Gaither
William T. Jones
Inventor:
Spencer Otis.
by Thomas F. Sheridan
his Attorney

UNITED STATES PATENT OFFICE.

SPENCER OTIS, OF CHICAGO, ILLINOIS, ASSIGNOR TO NATIONAL DUMP CAR COMPANY, OF AUGUSTA, MAINE, A CORPORATION OF MAINE.

END SILL FOR CARS.

No. 12,552. Specification of Reissued Letters Patent. Reissued Nov. 6, 1906.

Original No. 825,675, dated July 10, 1906. Application for reissue filed July 30, 1906. Serial No. 328,487.

*To all whom it may concern:*

Be it known that I, SPENCER OTIS, a citizen of the United States, residing at Chicago, in the county of Cook and State of Illinois, have invented certain new and useful Improvements in End Sills for Cars, of which the following is a specification.

My invention relates to that class of end sills having a channel-beam member and gusset-plates secured to such channel-beam member extending below the lower edge thereof.

The principal object of my invention is to provide a simple, economical, and efficient end sill for cars.

A further object is to provide an end sill with suitable means for bracing and strengthening the principal member thereof, supporting the draw-bar shank, and connecting the principal member of the end sill with the longitudinal center sills.

Other and further objects of the invention will appear from an examination of the drawings and the following description and claims.

The invention consists in the features, combinations, and details of construction hereinafter described and claimed.

In the accompanying drawings, Figure 1 is a plan view of the angle-iron member of the end sills, showing the manner of connecting it with the longitudinal center sills; Fig. 2, a plan view of the complete end sill; Fig. 3, a side elevation of the same looking at it from the end of the car, and Fig. 4 a transverse central sectional elevation taken on line 4 of Fig. 2 looking in the direction of the arrow.

In the art to which this invention relates it is very desirable to provide at each end of the car an end sill with a main body portion or member formed of a channel-beam having top and bottom flanges, both of which are continuous and unbroken at the central portion of the sill, enabling both flanges to extend the entire length of the sill, if desired, and to provide means for supporting the draw-bar shank beneath such channel-beam member. It is also very desirable to provide means for bracing such channel-beam member and connecting it with the longitudinal sills of the car in such a manner that the shocks and strains will be effectually resisted. In order to accomplish these purposes, an end sill is provided for each end of the car, having a main body portion formed of a channel-beam *a*, which extends from side to side of the car, each of such channel-beam members having an upper flange *b* and a lower flange *c*, extending outward endwise of the car from its upper and lower edges, respectively, both of such flanges being straight, continuous, and unbroken at the central portion of the sill and from end to end thereof. Vertical angular gusset-plates *d* are secured to the web portions of such channel-beams by means of rivets *e* and are provided with rearwardly-extending upright portions *f*, which are secured to the longitudinal center sills *g* by means of rivets *h*. The rearwardly-extending portions of these gusset-plates are substantially at right angles to the portions which extend longitudinally of the sill, and the longitudinal portions extend below the lower edge of the channel-beam member a sufficient distance to provide beneath the continuous and unbroken bottom flange of the channel-beam member and between such gusset-plates a space *i* for receiving the draw-bar shank. A draw-bar-shank-supporting member *j* extends across the lower side of this space and is secured to longitudinal portions of the vertical gusset-plates, being formed of an angle-iron having its horizontal flange *k* extending from the upper edge thereof endwise of the car and parallel with the lower flange of the channel-beam member. The rearwardly-extending vertical portions of the gusset-plates above described also extend below the lower edge of the channel-beam member and are each provided with an upwardly-projecting portion *l*, which extends above the longitudinal center sills.

A top plate *m* is secured to the upper flange of the channel-beam member by means of rivets *n* and to the rearwardly-extending portions of the vertical gusset-plates above described by means of connecting angles *o*, riveted to such top plate and gusset-plates. This top plate extends rearward from the channel-beam over the rearwardly-extending portions of the vertical gusset-plates and is provided at its rear edge with a strengthening angle-iron member *p*, which is riveted thereto and has an upwardly-extending flange portion adapted to strengthen the top plate vertically.

A horizontal gusset-plate *q* is secured to the top flanges *r* of the longitudinal sills by means of rivets *s*, and an angle-iron brace *t* is mounted upon such horizontal gusset-plate, to which it is secured by means of rivets *u*, which also connect such brace and gusset-plate to the upper flange portions of the longitudinal sills. This angle-iron brace has an upwardly-extending flange portion *v* and extends over the horizontal gusset-plate and the longitudinal sills. At its opposite ends *w* the brace extends horizontally beneath the top plate and longitudinally of the end sill at an oblique angle, being secured to the channel-beam member and beneath the top plate by means of suitable rivets. Longitudinal side or intermediate sills *y* may be mounted upon opposite sides of the center sills and connected with the horizontal gusset-plate and angle-iron brace above described.

By this arrangement it will be seen that the channel-beam member has straight and continuous top and bottom flanges, both of which extend without interruption or curvature throughout its entire length, thus enabling the ordinary channel-beam of commerce to be employed to form the principal member of the end sill. The upright gusset-plates, extending, as they do, below the lower edge of the channel-beam and forming a space beneath its bottom flange for receiving the draw-bar shank, obviate the necessity of making a notch in the lower side of the channel-beam member, which would have the effect of weakening it. The beam is also strengthened horizontally by the horizontal gusset-plate and vertically by the vertical gusset-plates. It is also further strengthened by the angle-iron brace member, connected, as above described, at its ends to the web portion of the channel-bar and having its intermediate portion spaced from the channel-bar, as well as by the manner of connecting the angle-iron brace member with the horizontal gusset-plate and with the longitudinal sills and channel-bar member.

I claim—

1. A railway-car having an end sill and a center sill, said end sill comprising a main body portion and a continuous horizontal brace member secured at its ends to the main body portion, said brace member having its intermediate portion spaced from the main body portion and secured to the center sill of the car.

2. A railway-car having an end sill and center sill, said end sill comprising a main body portion and a continuous horizontal iron brace member, said brace member being secured at its ends to the main body portion and having its intermediate portion spaced from the main body portion and having its horizontal flange at the intermediate portion secured to the center sill of the car.

3. In an end sill for railway-cars, the combination of a main body portion, comprising a channel-bar extending from side to side of the car, and a continuous angle-brace member secured at its ends to the web of the channel-bar, said brace member having its intermediate portion spaced from the channel-bar and secured to its horizontal flange to the center sill of the car.

4. In an end sill for cars, the combination of a main body portion formed of a channel-beam having top and bottom flanges both of which are continuous and unbroken at the central portion of the sill, separate spaced gusset-plates, one on each side of the central portion of the sill, and a draw-bar-shank-supporting member parallel with the sill-flanges secured to the gusset-plates.

5. In an end sill for cars, the combination of a main body portion formed of a channel-beam having top and bottom flanges both of which are continuous and unbroken at the central portion thereof, vertical gusset-plate members extending below the lower edges such channel-beam member on opposite sides of its longitudinal center and forming a space between the lower portions thereof and below the channel-iron member, and a supporting member mounted upon and extending across the space between such gusset-plate members for supporting a draw-bar member.

6. In an end sill for cars, the combination of a main body portion, vertical gusset-plates having longitudinally-extending portions secured to such main body portion and laterally-extending portions adapted to be secured to the longitudinal sills of the car, and a horizontal gusset-plate secured to such vertical gusset-plate members.

7. In an end sill for cars, the combination of a main body portion, vertical angular gusset-plates having longitudinal portions secured to and extending below such main body portion and having lateral vertical flanges extending to the upper edge of such main body portion, a top plate secured to such main body portion of the end sill, and to the lateral vertical portions of such gusset-plates, and a horizontal gusset-plate secured to the laterally-extending portions of such vertical gusset-plates.

8. In an end sill for cars, the combination of a main body portion, vertical angular gusset-plates having longitudinal portions secured to and extending below such main body portion and lateral portions extending to the upper edge of such main body portion and longitudinally of the car adapted to be secured to the longitudinal sills, a top plate secured to such main body portion of the end sill and to the lateral portions of such vertical gusset-plates, a horizontal gusset-plate secured to such laterally-extending portions of the vertical gusset-plates below the level of the top plate, and an angular brace mounted upon such horizontal plate extending beneath the top plate and secured to the main body portion of the end sill.

9. In an end sill for cars, the combination of a main body portion formed of a channel-beam having top and bottom flanges, vertical gusset-plates secured to such channel-beam member and having laterally-extending portions on the side thereof opposite the top and bottom flanges adapted to be secured to the longitudinal sills of the car, and a horizontal gusset-plate extending over such laterally-extending portions of the vertical gusset-plate.

10. In an end sill for cars, the combination of a main body portion formed of a channel-beam having top and bottom flanges, vertical gusset-plates secured to such channel-beam member and having laterally-extending portions on the side thereof opposite the top and bottom flanges adapted to be secured to the longitudinal sills of the car, a horizontal gusset-plate extending over such laterally-extending portions of the vertical gusset-plates, a top plate secured to the upper edge of the channel-beam member, and an angular brace member mounted upon the horizontal gusset-plate extending beneath the top plate and secured to the horizontal gusset-plate and the channel-beam member.

11. In an end sill for cars, the combination of a main body portion formed of a channel-beam having top and bottom flanges, vertical gusset-plates secured to such channel-beam member and having laterally-extending portions on the side thereof opposite the top and bottom flanges adapted to be secured to the longitudinal sills of the car, a horizontal gusset-plate extending over such laterally-extending portions of the vertical gusset-plate, a top plate secured to the upper edge of the channel-beam member, an angular brace member mounted upon the horizontal gusset-plate extending beneath the top plate and secured to the horizontal gusset-plate and the channel-beam member, and a supporting member mounted upon the lower portions of such vertical gusset-plate members for supporting a draw-bar member therebetween.

SPENCER OTIS.

Witnesses:
CHARLES F. FITTS,
CLIFFORD C. BRADBURY.